Oct. 15, 1946.　　　　M. BRAVO　　　　2,409,469
INCENSE DISPENSER
Filed July 14, 1944
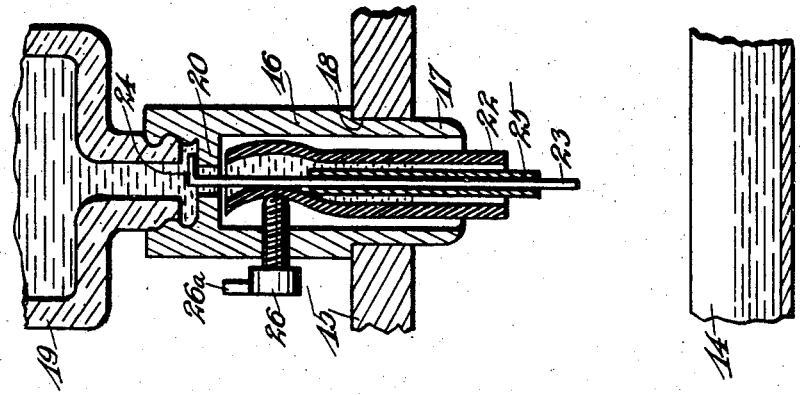
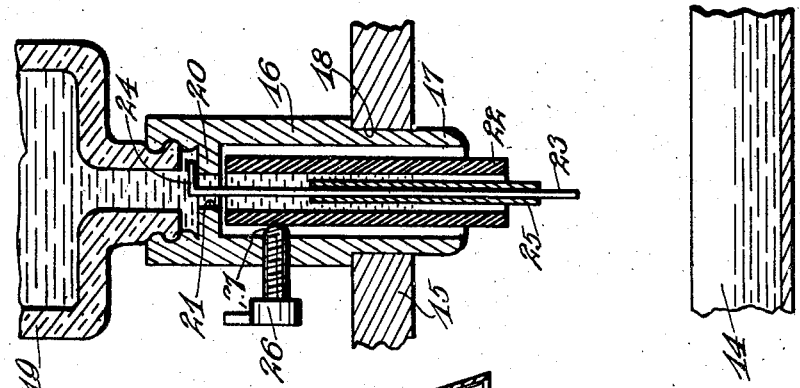
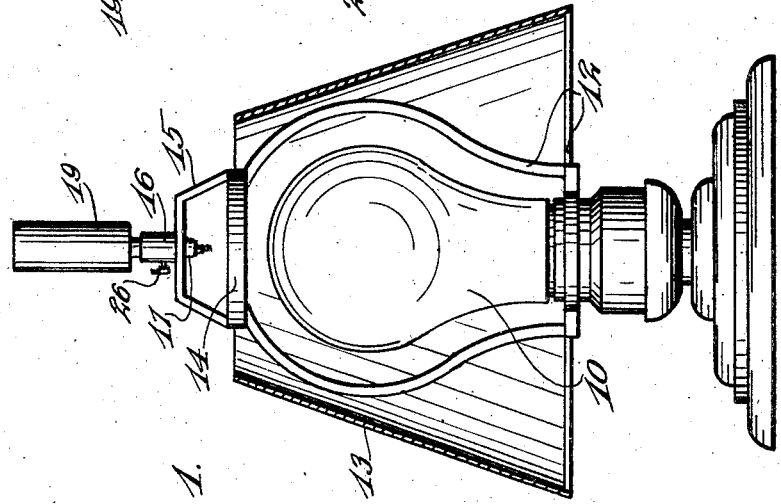
M. Bravo
INVENTOR.
BY *Miles B. Stevens & Co.*
*Attorneys.*

Patented Oct. 15, 1946

2,409,469

UNITED STATES PATENT OFFICE 2,409,469

INCENSE DISPENSER

Mauricio Bravo, Chicago, Ill.

Application July 14, 1944, Serial No. 544,973

3 Claims. (Cl. 222—422)

My invention relates to devices for dispensing incense, perfumes, disinfectants or deodorants in liquid form, and my main object is to provide a device which is capable of dispensing or yielding minute quantities or fine drops of the above-named substances from an inverted bottle or other container to which the device is attached.

A further object is to provide a device of the above character which promotes the flow of the liquid substance whether the same is of an oily or gummy consistency.

A still further object is to provide a control which regulates the flow of the substance to any desired rate.

Another object is to include air supply means in the device to offset tendencies to check or retard the flow of the substance by capillary attraction.

An important object is to design the device along lines of simplicity and compactness, whereby to render its manufacture inexpensive and its position inconspicuous.

With the above objects in view and any others which may suggest themselves from the description to follow, a better understanding of the invention may be had by reference to the accompanying drawing, in which—

Fig. 1 is a section of a lamp-type incense or perfume vaporizer, showing the dispenser installed;

Fig. 2 is an enlarged vertical section of the dispenser before it is put in use; and Fig. 3 is a view similar to Fig. 2, showing the dispenser positioned as in use.

The efficient or economical vaporization of a liquid incense, perfume or like substance requires heat, and various means have been employed to generate the necessary heat and provide a medium of moisture for the dissipation or diffusion of the fragrance or odor of the substance into the surrounding atmosphere.

One form of apparatus for the purpose just mentioned is illustrated in Fig. 1 in the form of a conventional electric lamp 10. The latter is built with an ornamental base 11 and carries a frame 12 for the support of a shade 13. The frame also carries a shallow pan 14 at the top, surmounted by a stand 15. The dispenser is in the form of a small vertical cylinder 16, reduced at its lower end as indicated at 17 to be snugly insertible in a central opening 18 made in the stand 15. The dispenser is position above the center of the pan 14 and receives an inverted bottle 19 of the liquid incense, perfume or other substance at the top.

Specifically, the dispenser is a solid body of metal, plastic or other material which is impervious to heat and any deteriorating or corrosive ingredients contained in the liquid received from the bottle 19. The mouth of the latter is threaded to fit into the upper end of the cylinder 16; and the latter has a partition 20 with a central opening 21 directly below the opening in the mouth of the bottle.

The cylinder 16 is hollow below the partition 20 and open at its lower end. It first receives a lining in the form of a vertical tube 22 of soft synthetic rubber. The tube is of a diameter to be close to but free of the internal wall of the cylinder; and the composition of the tube must, of course, render it immune to dissolving or deteriorating ingredients in the liquid passing through the dispenser.

The center of the dispenser is occupied by a vertical wire 23 having a top bend or hook 24 which employs the partition 20 as a support, so that the wire is suspended within the tube 22. The wire 23 receives a glass tube 25 over the greater part of its length, this tube being slidably mounted on the wire. In respect to length, the rubber tube 22 projects a short distance below the reduction 17 of the cylinder 16, while the glass tube 25 projects a further distance in a downward direction; and the wire 23 projects a still further distance to terminate in the clear in respect to the parts surrounding it. The cylinder 16 receives an adjustable screw 26 in one side, the inner end of the screw being preferably rounded as indicated at 27 and designed to come in contact with the rubber tube 22 at a point above the glass tube 25. The screw has a pointer 26a.

While the drawing shows the parts just described spaced considerably for purpose of clarity, their positions in the actual dispenser—which is only slightly larger than shown in Fig. 1— are considerably closer. Thus, while the rubber tube 22 is of a diameter to be free of the internal wall of the dispenser, the initial pressure of the adjusting screw 26 imparts a slight flatness to the impressed region of the tube effective to bulge it laterally into a sufficient engagement with the cylinder to support the tube. The actual contact of the tube and cylinder is thus at two points only, so that the tube may be considered as almost entirely spaced from the cylinder wall.

Since the substance dispensed is generally of an oily or gummy consistency, it may be assumed that its flow from the inverted bottle 19 into the dispenser is at a slow rate. In fact when the liquid issues into the space above the partition 20, its tendency will be to retard or stop its flow into the partition opening 21 by reason of capillary attraction. However, the upper part of the wire 23 will become coated with the substance, which will have a tendency to wet or moisten a further portion of the wire.

In order that the flow of the substance may be promoted in the present dispenser, the circular film or body of air between the rubber tube 22 and the dispenser wall is depended upon to reach the upper portion of the wire 23 and operate to displace a sufficient amount of the liquid, so that the same may trickle or seep downwardly along the wire. The amount of seepage or flow may now be controlled by the application or advance of the adjusting screw 26 to constrict the rubber tube 22 to a desired degree. Now the flow assumes a correspondingly slower rate, but is aided by the air in the inside of the rubber tube to continue on its downward course. However, a still closer control is required where the dispensing of the liquid is to be very fine or occasional, and this control is provided by the glass tube 25. Primarily, this tube clings to the wire 23 the moment the slightest amount of liquid flows between the glass tube and the wire, since the adhesive quality in the liquid and irregularities on the inside surface of the tube provide a sufficient bond for the tube to cling to the wire. However, the provision of air from above tends to attenuate the film of liquid passing between the glass tube and wire, so that such film very slowly seeps through the tube and down upon the exposed portion of the wire. A considerable time—even as long as 10 or 15 minutes—may occur before a sufficient accumulation of liquid will form at the lower end of the wire to yield a minute drop. However, when such a drop is formed, it will be of sufficient weight to fall from the wire.

The pan 14 over the lamp 10 receives a filling of water which is allowed to become heated by lighting the lamp over a short period. Now the dispenser may be adjusted as described to yield a fine particle or drop of the incense, perfume or other substance at a desired rate. When such particle or drop falls into the hot water, it will be caused to vaporize and be carried off by the water vapors to be disposed or diffused into the surrounding atmosphere.

It will be evident from the above description that I have provided a dispenser which is designed to overcome the natural resistance of oily or gummy liquids to issue from a container or be available in very small amounts. Also, the dispenser contains means to regulate the flow of the substance or even shut it off entirely when the adjusting screw is fully advanced. The flow of the substance is obtained by the proviison of air at points where air displacement can best operate to overcome capillary attraction, while the internal glass tube further refines the flow to a film which by its own nature moves at so slow a rate that the particle or drop dispensed may be only occasionally formed. In this manner, the substance may be so controlled as to last over a very long period and render its use extremely economical. It may be added that the usual application of heat before the dispenser is adjusted into action will help to create rising air currents in the passages within the dispenser, whereby to render the substance more fluid and cooperative with the displacing factor of the air. Finally, it will be apparent that the novel dispenser is an article of extremely few parts, simple design and compact form.

While I have described the invention along specific lines, various minor changes or refinements may be made therein without departing from its principle, and I desire to consider such changes and refinements as coming within the scope and spirit of the appended claims.

I claim:

1. A dispenser for slowly flowing liquids comprising a member having a receptacle in its top for the mouth of a container of the liquid, a downwardly-opening chamber in its lower part, a perforated partition between the receptacle and the chamber, a vertical wire suspended from the perforated portion of the partition for leading the liquid downwardly from said mouth, and means for limiting the flow of the liquid along said wire, said means comprising a flexible tube surrounding the wire, and a set screw applied to the tube by way of the chamber wall to constrict the tube in respect to the wire.

2. A dispenser for slowly flowing liquids comprising a member having a receptacle in its top for the mouth of a container of the liquid, a downwardly-opening chamber in its lower part, a perforated partition between the receptacle and the chamber, a vertical wire suspended from the perforated portion of the partition for leading the liquid downwardly from said mouth, and means for limiting the flow of the liquid along said wire, said means comprising a flexible tube surrounding the wire, and a set screw applied to the tube by way of the chamber wall to constrict the tube in respect to the wire, the tube being spaced on the outside from the chamber wall and on the inside from the wire.

3. A dispenser for slowly flowing liquids comprising a member having a receptacle in its top for the mouth of a container of the liquid, a downwardly-opening chamber in its lower part, a perforated partition between the receptacle and the chamber, and means suspended from the perforated portion of the partition for leading the liquid downwardly from said mouth, said means being a vertical wire with a top bend supported on the partition adjacent its perforation, and a tube of smooth texture and hard material mounted on the wire with a close clearance to attenuate the liquid descending on the wire toward forming a small drop at the lower end thereof.

MAURICIO BRAVO.